3,173,894
PROCESS FOR THE MANUFACTURE OF
FORMALDEHYDE POLYMERS
Hans Dieter Hermann and Edgar Fischer, Frankfurt am
Main, Germany, assignors to Farbwerke Hoechst Aktiengesellschaft vormals Meister Lucius & Brüning,
Frankfurt am Main, Germany, a corporation of
Germany
No Drawing. Filed Dec. 22, 1959, Ser. No. 861,225
Claims priority, application Germany, Dec. 27, 1958,
F 27,379
12 Claims. (Cl. 260—67)

The present invention relates to a process for the manufacture of formaldehyde polymers.

It is known that formaldehyde can be polymerized in an inert organic solvent in the presence of an acid or basic catalyst, for example an inorganic acid, borontrichloride or an amine. The polymers prepared in the presence of an acid catalyst are, however, so brittle and unstable that they cannot be processed on an industrial scale. Formaldehyde polymers of high molecular weight having thermoplastic properties have also been prepared with the use of simple amines, such as a lower tertiary or secondary aliphatic amine, as the catalyst, but these polymers exhibit an unsatisfactory thermostability.

It has also been proposed to polymerize formaldehyde using phosphines, arsines, carbonyls, organo-metal compounds and quaternary ammonium salts as the catalyst. Under otherwise identical conditions, however, these catalysts did not permit the preparation of any polymers having better thermal stability than those prepared with the use of a known basic catalyst.

The present invention provides a process for the manufacture of thermoplastic formaldehyde polymers of high molecular weight and improved thermal stability by polymerizing pure formaldehyde in an inert solvent, wherein the catalyst used is a compound of the general formula $$N{\begin{matrix}CH_2-R_1\\CH_2-R_2\\CH_2-R_3\end{matrix}}$$

in which $R_1$ represents a hydrogen atom, a methyl or an alkyl group containing from 2 to 22 carbon atoms in a straight or branched hydrocarbon chain, or advantageously a $-C_2H_5$, $-C_3H_7$, $C_4H_9$ or stearyl group, or represents a cycloalkyl group, such as a cyclohexyl or cyclopentyl group, or represents an aryl or aralkyl group, advantageously a phenyl, benzyl, tolyl or xylyl group or the higher homologs thereof, $R_2$ represents substantially the same substituents as $R_1$ and $R_3$, and $R_3$ represents an aliphatic or aromatic or heterocyclic radical which contains at most 50 carbon atoms and, in addition to carbon and hydrogen, contains at least one not metallic hetero atom bivalent or trivalent with respect to hydrogen, preferably an oxygen or nitrogen atom, and also contains at least one of the following groupings

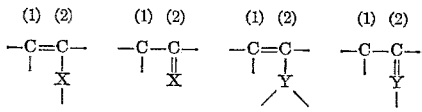

in which X represents a bivalent hetero atom and Y represents a trivalent hetero atom and the carbon atom (1) is directly attached to the $CH_2-$ group in the $\alpha$-position to the nitrogen atom in the above formula, whereby said groupings may also form part of a ring system, and the substituent $R_3$ may contain a further number of the aforesaid hetero atoms.

The above catalysts constitute readily accessible viscous liquids or crystalline substances which can be prepared by conventional methods, for example by the Mannich synthesis, from primary or secondary amines, formaldehyde and an organic compound containing at least one reactive hydrogen atom. As amines which may be used in the process of this invention there may be mentioned more especially: secondary amines, such as dimethylamine, diethylamine, methylstearylamine, diethanolamine, $\beta,\beta$-dichloro diethylamine, $\beta$-cyanoethylmethylamine, N-methylbenzylamine, N-methyl-(cyclohexylmethyl)-amine, or primary amines, such as methylamine, ethylamine, propylamine, stearylamine, benzylamine or cyclohexylmethylamine. As compounds carrying reactive hydrogen atoms which may be used in the process of this invention, there may be mentioned more especially: mono- or polynuclear phenols, such as phenol, $\alpha$-naphthol, $\beta$-naphthol, or alkyl derivatives and nitrogen-containing derivatives of these compounds, such as ortho, meta or para cresol, m-dimethylamino-phenol, or $\alpha$-nitro-$\beta$-naphthol; furthermore heterocyclic compounds, such as indole, quinoline, 8-hydroxyquinoline, pyrrole, $\alpha$-picoline, thiophene, furane, quinaldine; also ketones, such as cyclohexanone, methylethylketone, acetophenone; 1,3-diketones, for example acetylacetone, and also malonic acid derivatives, such as malonic acid diamide or malonic acid diethyl esters.

As catalysts in which the groupings

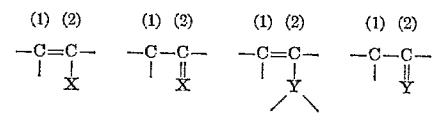

are attached to the $\alpha$-carbon atom of the tertiary nitrogen atom, there may be mentioned more espeically, for example: N-(2-oxy-4-dimethylamino-5-methylbenzyl)-N-dimethylamine, N-stearyl-N-bis-(2-oxynaphthylmethyl)-amine, N-methyl - N - stearyl-N-(3-indolylmethyl)-amine, 2,4,6-tris-(N-dimethylaminomethylphenol), N-dimethylaminomethyl malonic acid diamide, 2,4-bis-(N-dimethylaminomethyl)-6-methylphenol, 7-(N-dimethylaminomethyl)-8-hydroxyquinoline, 2-(N-diethylaminomethyl)-cyclohexanone, 2-dimethylaminomethyl-4-methyl-5-dimethylaminophenol, 2,5-bis-(diethanolaminomethyl)-thiophene, N-$\beta$-benzoylethyl-N-diethylamine, $\beta$-dimethylamino-methyl-$\alpha$-naphthol and, furthermore, compounds which can be obtained from the above materials, by the Mannich reaction (see F. F. Blicke, Org. Reactions I, page 303 (1942)), and correspond to the formula given above.

The above substances have only been mentioned by way of example but they are not intended to limit the scope of the invention thereto.

The aforesaid catalysts may be used alone or in admixture with other catalysts, for example with the lower secondary or teriary aliphatic amines with quaternary ammonium salts or phosphines used in the polymerization of formaldehyde. Especially suitable are for example tri-N-butylamine, N-methyl-stearylamine, triphenylphosphine and N-trimethylstearyl ammonium stearate. Depending on the reaction conditions selected, one or more of the above catalysts may be used in the undissolved or advantageously in the dissolved state. It is advantageous to dissolve the catalyst or mixture of catalysts in the inert organic solvent in which the formaldehyde is polymerized.

The amount of catalyst used may vary within wide limits. Very minor amounts of catalyst may initiate the polymerization in those cases where the starting substances used are fairly pure. The catalysts are generally used in a proportion of between about 0.001 mol percent and about 0.1 mol percent, advantageously between 0.001 mol percent and 0.05 mol percent, calculated on the amount of monomeric formaldehyde used. An amount of catalyst greater than indicated above may also be used, but such greater amount involves advantages only in special cases. The amount of catalyst used within the above limits depends on the catalytic activity of the compound added and/or the degree of purity of the monomer and the solvent used, decreasing amounts of catalyst being used with increasing purity of monomer and solvent. The above catalyst may also be used in the form of a combination with a conventional catalyst which may be added in an amount of about 0.001–1 mol percent, advantageously 0.05–0.1 mol percent.

The reaction is carried out using fairly pure formaldehyde containing water to an extent of less than 0.1% by weight, advantageously less than 0.05% by weight, which can be obtained in known manner, for example from paraformaldehyde, α-polyoxymethylene, hemiformals or trioxane. The formaldehyde is continuously introduced as it is consumed by polymerization, that is to say the formaldehyde is added in the same rate as the portion previously added undergoes polymerization, into an inert organic solvent which also contains the catalyst, advantageously in the dissolved state. It is sometimes advantageous to continuously or discontinuously introduce the catalyst or a solution thereof in an inert solvent during the polymerization.

Suitable inert organic solvents are the alkyl ethers, such as diethylether, diisopropylether, dibutylether or cyclic ethers, such as tetrahydrofurane, dioxane or aliphatic hydrocarbons or mixtures thereof containing between about 3 and 10 carbon atoms, cycloaliphatic hydrocarbons, such as cyclohexane, aromatic hydrocarbons, such as benzene, toluene or xylene; halogenated aliphatic hydrocarbons, such as dichloromethane, and halogenated aromates, such as chlorobenzene. The aforesaid solvents should be free from impurities which impair the polymerization, for example water, alcohols or carboxylic acids. It is especially advantageous to use solvents which dissolve the catalyst wholly or partially.

The amount of solvent used may vary within wide limits. It is, however, advantageous to use the solvent in an amount at least twice as great as the amount of polymer expected. The proportion of solvent to be used in a given case substantially depends on the polymerization conditions selected and on economical reasons. The amount of solvent used is not critical and is merely determined by the practical manipulation of the polymerization batch. Speaking generally, it is advantageous to use the solvent in an amount not greater than 50 times the amount of polymer. The polymerization is carried out with the exclusion of oxygen, advantageously while stirring.

The polymerization temperature may also vary within wide limits. It is, however, convenient to work at a temperature of between about −20° C. and about +60° C., preferably between about 0° C. and about 40° C. The polymerization may be carried out continuously or discontinuously in a reaction vessel usual for polymerization processes.

It has unexpectedly been found that the polymerization of formaldehyde in the presence of the tertiary amines referred to above leads to tough and stable thermoplastic formaldehyde polymers which exhibit a substantially improved thermostability as compared with the thermoplastic formaldehyde polymers obtained under otherwise identical conditions in the presence of a known catalyst. The catalysts used in the process of this invention possess the unexpected property of bringing about such improved thermal stability, although the same good thermal stability cannot be obtained by subsequent incorporation of the catalysts into the polymer. The catalysts used enable end products of good thermostability to be obtained without adding a stabilizer, but this statement is not intended to exclude the possibility that a stabilizer may be incorporated into the final products to still further increase their thermal stability. Such stabilizers may also be added during the polymerization process. As stabilizers there may be used more especially, for example: amides of polyvalent carboxylic acids, such as malonic acid diamide, phenols, such as m-dimethylaminophenol, hydrazines, such as phenylhydrazine, amines, such as diphenylamine, and urea derivatives such as diphenylurea.

The polymers prepared by the process of this invention may be mixed with about 0.1% by weight to 5% by weight of a dicarboxylic acid amide and then made into tough, translucent films, filaments or molded articles which do not embrittle even after a prolonged storage and are distinguished by an especially good thermal stability.

The following examples serve to illustrate the invention, but they are not intended to limit it thereto:

EXAMPLE 1

100 grams commercial para-formaldehyde were suspended in 250 cc. of a mixture of aliphatic hydrocarbons boiling between 210° C. and 250° C. and thermally decomposed while stirring with the exclusion of oxygen. The gaseous formaldehyde evolved was passed through a vertically arranged glass tube in order to be purified. The upper part of the glass tube was filled with inert filling material and cooled to −10° C. Subsequently, the formaldehyde was introduced into a reaction vessel which contained 500 cc. of a mixture of aliphatic hydrocarbons boiling between 210° C. and 250° C., and 0.05 mol percent of one of the catalysts specified below. The polymerization medium was vigorously stirred and kept at a temperature of 25° C. by cooling. White polymer particles were obtained which were vacuum filtered, washed with cyclohexane and dried. The products so prepared were tested as to their thermal stability. The results obtained are indicated in the following table.

Table

THERMOSTABILITY OF FORMALDEHYDE POLYMERS PREPARED WITH DIFFERENT CATALYSTS

| Catalyst | Stability of polymers' loss in weight in percent at 200° C. within 30 minutes under nitrogen |
|---|---|
| (A) Products prepared with known catalysts: | |
| Tri-n-butylamine | 51 |
| N-methyl-stearylamine | 64 |
| Triphenylphosphine | 50 |
| N-trimethyl-stearylammonium stearate | 51 |
| (B) Products prepared with the catalysts used in this invention: | |
| N-stearyl-N-bis-(2-hydroxynaphthylmethyl)-amine | 28 |
| N-stearyl-N-methyl-N-3-indolymethylamine | 17 |
| 2,4,6-tris-(N-dimethylaminomethyl)-phenol | 33 |
| 2,4-bis-(N-dimethylaminomethyl)-6-methylphenol | 30 |
| 7-(N-dimethylaminomethyl)-8-oxyquinoline | 11 |
| 2-(N-diethylaminomethyl)-cyclohexanone | 21 |
| N-dimethylaminomethyl malonic acid diamide | 10 |

EXAMPLE 2

100 grams commercial paraformaldehyde were thermally decomposed within 2 hours at 140–160° C. The gaseous formaldehyde evolved was freed from impurities in the manner described in Example 1 and continuously introduced into a polymerization vessel which was kept at 20° C. The polymerization medium which was intensely stirred consisted of 500 cc. pure n-octane; it contained 0.01 mol percent 2-dimethylaminomethyl-4-methyl-5-dimethylaminophenol as the catalyst. The resulting polymer was vacuum filtered, washed with cyclohexane, and dried. 60 grams polyformaldehyde were obtained. The product so prepared underwent a loss in weight of only 12% within 30 minutes at 200° C. under nitrogen.

In a parallel test carried out under otherwise identical conditions 0.01 mol percent tri-n-butylamine and 0.1 gram m-dimethylaminophenol were used in the place of the above amine. The polymer obtained underwent a loss in weight of 44% within 30 minutes at 200° C. under nitrogen and was strongly colored. The polymer was obtained in a yield of 52 grams.

EXAMPLE 3

5 grams polyformaldehyde which decomposed to an extent of 44% within 30 minutes at 200° C. under nitrogen was intimately mixed with 0.1 gram 2-dimethylaminomethyl-4-methyl-5-dimethylaminophenol. The substance added did not exhibit stabilizing properties; the polymer decomposed after the substance had been admixed to an extent of 50% within 30 minutes at 200° C. under nitrogen. When the same polymer was mixed with 2% m-dimethylaminophenol, it decomposed to an extent of 29% by weight within 30 minutes at 200° C. under nitrogen.

EXAMPLE 4

100 grams commercial paraformaldehyde were thermally decomposed, the gaseous formaldehyde evolved was purified in the manner described in Example 1 and introduced within 90 minutes, while stirring intensely and with the exclusion of oxygen and moisture, into 500 cc. pure cyclohexane. Polymerization set in at once. During polymerization, the polymerization medium, which contained 0.01 mol percent 3-(dimethylaminomethyl)-indole, was kept at a temperature of 25–30° C. When the polymerization was complete, the polymer was vacuum filtered, washed out, dried and intimately mixed with 1% malonic acid diamide. 59 grams polyformaldehyde which decomposed to an extent of 4.9% within 30 minutes at 200° C. under nitrogen were obtained.

We claim:

1. A process for the manufacture of thermoplastic formaldehyde polymers of high molecular weight and improved thermal stability which comprises contacting pure monomeric formaldehyde at a temperature between about −20° C. and about 60° C. in an inert solvent with at least one catalytic compound of the formula $$N \begin{cases} CH_2-R_1 \\ CH_2-R_2 \\ CH_2-R_3 \end{cases}$$

wherein $R_1$ is a member selected from the group consisting of hydrogen, alkyl having up to 22 carbon atoms, hydroxymethyl, chloromethyl, phenyl, cyclohexyl, and cyanomethyl, $R_2$ is a member of the group consisting of $R_1$ and $R_3$, and $R_3$ is a member selected from the group consisting of hydroxyphenyl, alkyl-hydroxyphenyl, aminohydroxyphenyl, hydroxy-naphthyl, α-nitro-β-hydroxy-naphthyl, indolyl, quinolyl, hydroxy-quinolyl, α-picolyl, thienyl, furyl, pyrryl,

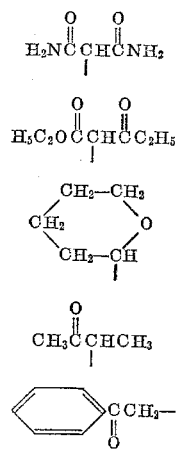

and

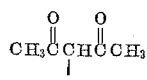

2. A process as in claim 1 wherein $R_1$ is stearyl.
3. A process as in claim 1 wherein $R_3$ is hydroxyphenyl.
4. A process as in claim 1 wherein said catalyst is 2-dimethylaminomethyl-4-methyl-5-dimethylaminophenol.
5. A process as in claim 1 wherein said catalyst is N-dimethylaminomethyl malonic acid diamide.
6. A process as in claim 1 wherein said catalyst is 7-(N-dimethylaminomethyl)-8-hydroxyquinoline.
7. A process as in claim 1 wherein said catalyst is present in an amount of between 0.001 mol percent and 0.1 mol percent of the amount of monomeric formaldehyde.
8. A process as in claim 1 wherein said catalyst is present in an amount between 0.001 mol percent and 0.05 mol percent of the amount of monomeric formaldehyde.
9. A process as in claim 1 wherein said catalyst is present in combination with a conventional basic catalyst for the polymerization of formaldehyde.
10. A process as in claim 9 wherein said conventional basic catalyst is a compound selected from the group consisting of tri-N-butylamine, N-methyl-stearylamine, triphenylphosphine, and trimethyl-stearyl-ammonium stearate.
11. A process as in claim 1 wherein a stabilizer is additionally present.
12. A process for the manufacture of thermoplastic formaldehyde polymers of high molecular weight and improved thermal stability which comprises contacting pure monomeric formaldehyde at a temperature between about −20° C. and about 60° C. in an inert solvent with, as a catalyst, N-stearyl-N-bis-(2-hydroxynaphthylmethyl)-amine in an amount of 0.05 mol percent of the monomeric formaldehyde.

References Cited in the file of this patent

UNITED STATES PATENTS 2,844,561    Bechtold et al. _____ July 22, 1958

FOREIGN PATENTS 748,836    Great Britain _____ May 9, 1956